United States Patent
Kuo

(10) Patent No.: US 6,811,282 B1
(45) Date of Patent: Nov. 2, 2004

(54) STRAIGHT DOWN-TYPE BACKLIGHT MODULE ASSEMBLY STRUCTURE

(76) Inventor: Heng Huang Kuo, P.O.Box 26-757, Taipei (TW)

(*) Notice: Subject to any disclaimer, the term of this patent is extended or adjusted under 35 U.S.C. 154(b) by 0 days.

(21) Appl. No.: 10/418,980

(22) Filed: Apr. 18, 2003

(51) Int. Cl.⁷ .................................... F21V 11/00
(52) U.S. Cl. ................. 362/241; 362/307; 362/285; 362/31
(58) Field of Search ................. 362/241, 560, 362/308, 26, 31, 330, 329, 285, 800, 328, 217, 220, 260, 372, 297, 302

Primary Examiner—Thomas M. Sember
Assistant Examiner—Bao Q Truong
(74) Attorney, Agent, or Firm—Rosenberg, Klein & Lee

(57) ABSTRACT

An improved straight down-type backlight module assembly structure is described. A groove is disposed in a base in a position that facilitates detachment. The groove is used to receive a light-emitting component. When the light-emitting component is to be maintained or replaced, it is not necessary to make many unnecessary detachment actions, hence facilitating detachment and maintenance of the light-emitting component.

8 Claims, 8 Drawing Sheets

STRAIGHT DOWN-TYPE BACKLIGHT MODULE ASSEMBLY STRUCTURE

FIELD OF THE INVENTION

The present invention relates to an improved straight down-type backlight module assembly structure and, more particularly, to an improved straight down-type backlight module assembly structure, which has a groove for firm installation and convenient replacement of a light-emitting component.

BACKGROUND OF THE INVENTION

In a conventional, straight down-type backlight module, the light-emitting component thereof is disposed in a position on a base that makes detachment thereof difficult. If the light-emitting component is to be maintained or replaced, it is necessary to detach many unnecessary components, hence wasting much time and easily causing contamination of internal components by dust and unwanted impact and abrasion during detachment. Moreover, because the base is generally made of plastic, if the light-emitting component is disposed in the base, the problem of damaging heat radiation may arise to affect the lifetime of use of the light-emitting component.

FIG. 1 shows a conventional, straight down-type backlight module, wherein a base 60 is made of plastic material. The base 60 is a rectangle, whose inside is an arc plane 61. An arc-shaped first reflecting component 62 sticks onto the arc plane 61. A light-emitting component 63 is disposed in the base 60. Two top ends of the arc plane 61 connect to a rectangular diffusion plate 64. Second rectangular reflecting components 65 stick onto end faces of two short sides of the diffusion plate 64, respectively. A conventional, straight down-type backlight module is thus formed.

Because the light-emitting component 63 is disposed in the base 60, if it is to be maintained or replaced, it is necessary to perform many unnecessary detachment steps from outside to inside. Moreover, during detachment, dusts may contaminate internal components or unwanted impact of other components may occur. Besides, because the light-emitting component 63 is disposed in the base 60 made of plastic, the problem of damaging heat radiation may arise to reduce the lifetime of use of the light-emitting component.

Accordingly, the conventional, straight down-type backlight module has inconveniences and drawbacks in practical use. The present invention aims to solve the problems in the prior art.

SUMMARY OF THE INVENTION

The primary object of the present invention is to solve the problems such as time-consuming and difficult maintenance and replacement of the light-emitting component, unwanted impact and abrasion during detachment, contamination of internal components by dusts, and the reduced lifetime of use of the light-emitting component due to damaging heat radiation as occur in a conventional, straight down-type backlight module.

To achieve the above object, the present invention provides an improved straight down-type backlight module assembly structure, which comprises a base and a movable base. A groove is disposed in the middle of the base. Two sides of the base connect two short sides of a light guiding component. A light-emitting component is disposed on the movable base. The movable base covers over and is retained outside the groove of the base.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

Figure 1:
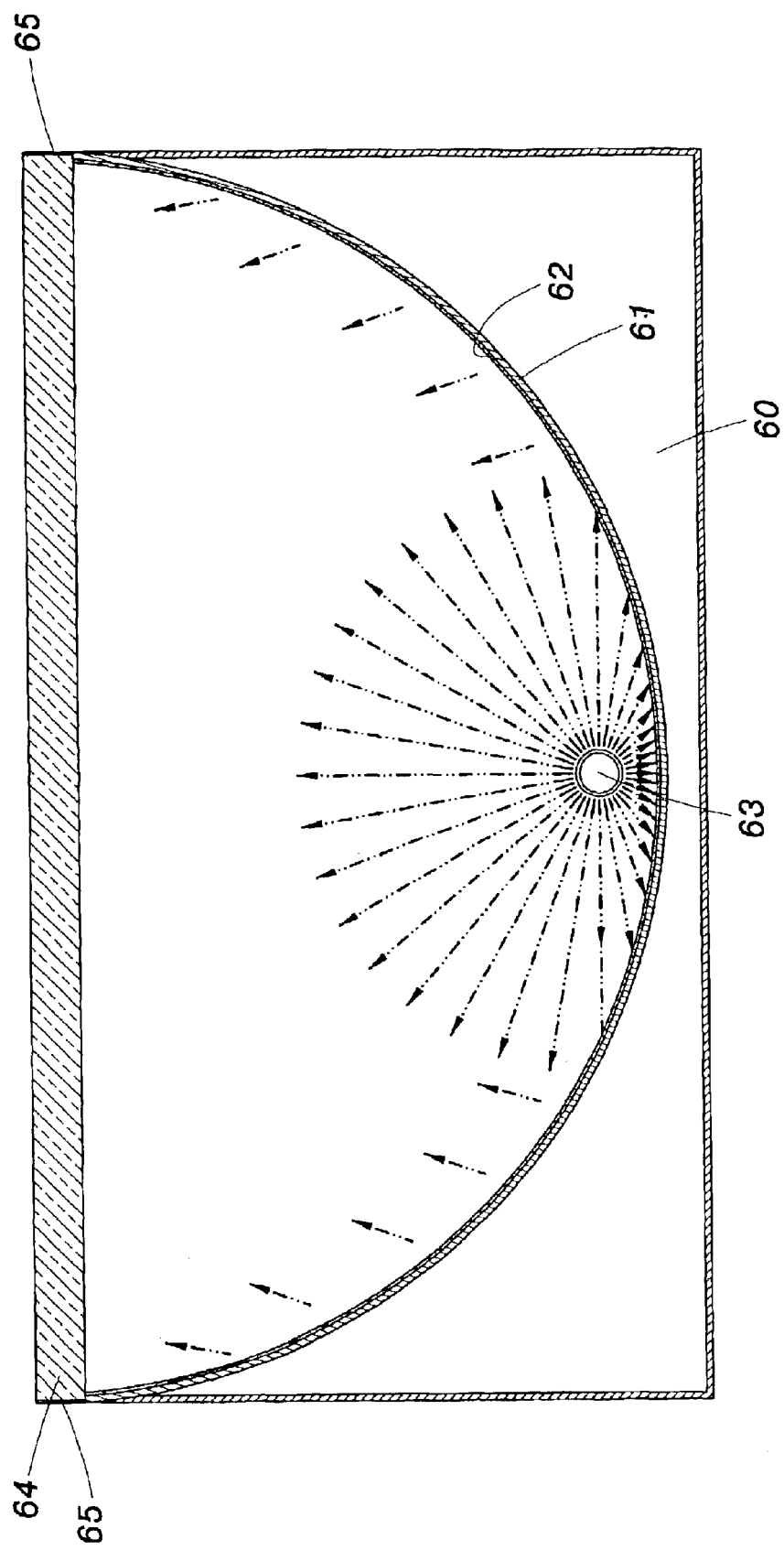
FIG. 1 is a cross-sectional view of a conventional, straight down-type backlight module.
Figure 2:
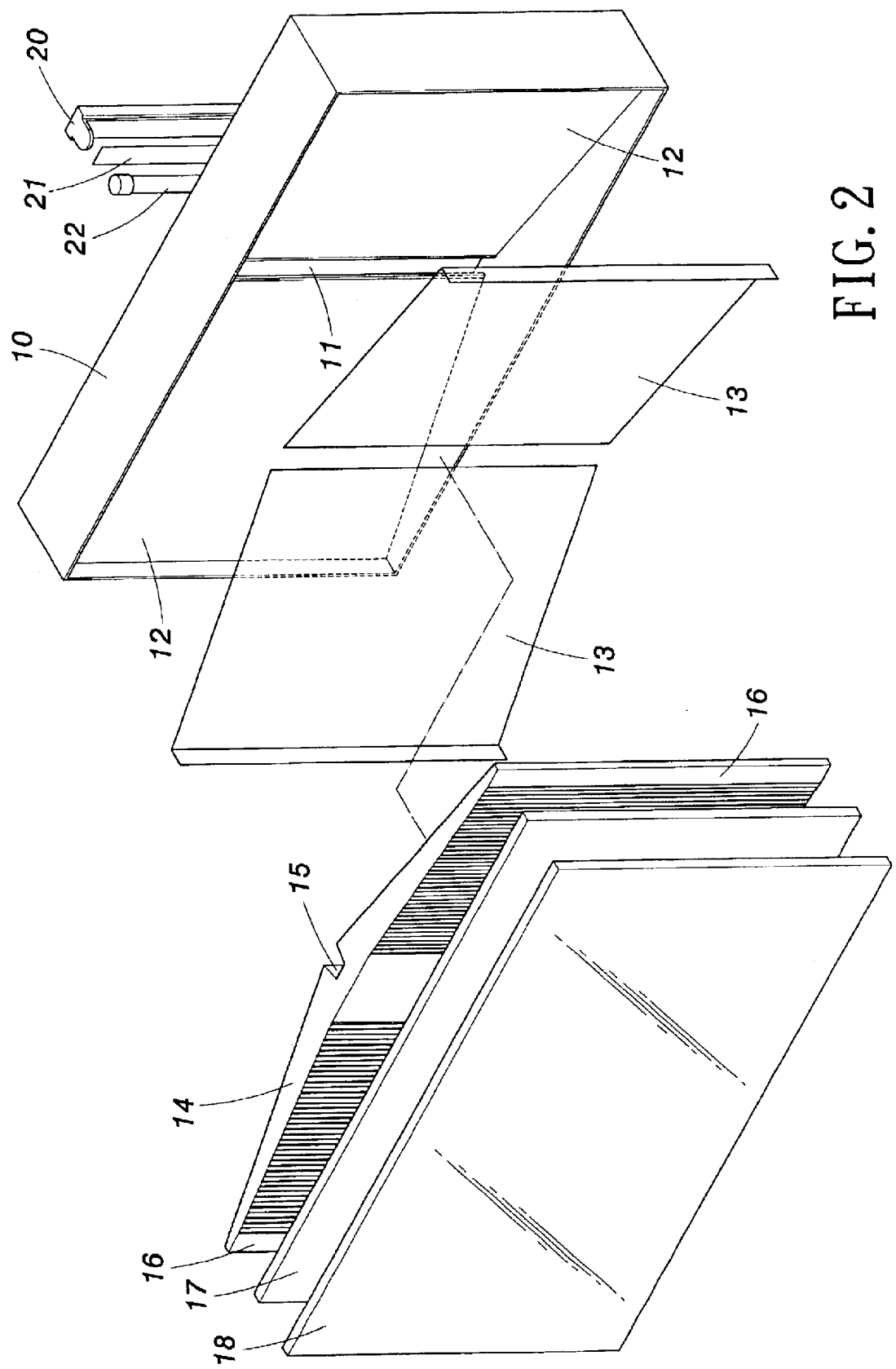
FIG. 2 is an exploded perspective view of a first embodiment of the present invention.

FIG. 2 shows a first embodiment of the present invention, which comprises a base 10 and a movable base 20. The base 10 is rectangular, and is made of a metal having good heat-radiating characteristic. A rectangular groove 11 is disposed in the middle of the base 10. Two sides of the groove 11 have inclines 12 tilting upwards from the center of the base 10. Two L-shaped first reflecting components 13 stick onto the two inclines 12, respectively. Or the first reflecting components 13 are directly electroplated onto the inclines 12. Two sides of the base 10 firmly connect two short sides of a V-shaped light guiding component 14. A rectangular receiving space 15 is formed at the center of the inside of the light-guiding component 14. Two outer short sides of the light guiding component 14 have rectangular connection faces 16. Rectangular diffusion plates 17 stick onto the connection faces 16, respectively. A liquid crystal module 18 sticks onto the outside of the diffusion plate 17.

The movable base 20 is a rectangle, and is made of metal having good heat-radiating characteristic. A rectangular second reflecting component 21 sticks onto the movable base 20, or the second reflecting component 21 is disposed on the movable base 20 by means of electroplating. A light-emitting component 22 is disposed on the second reflecting component 21. The light-emitting component 22 is a cold cathode fluorescent lamp (CCFL) or a light-emitting diode (LED). Leads are provided at two ends of the light-emitting component 22 for providing the required electricity.

Figure 3:
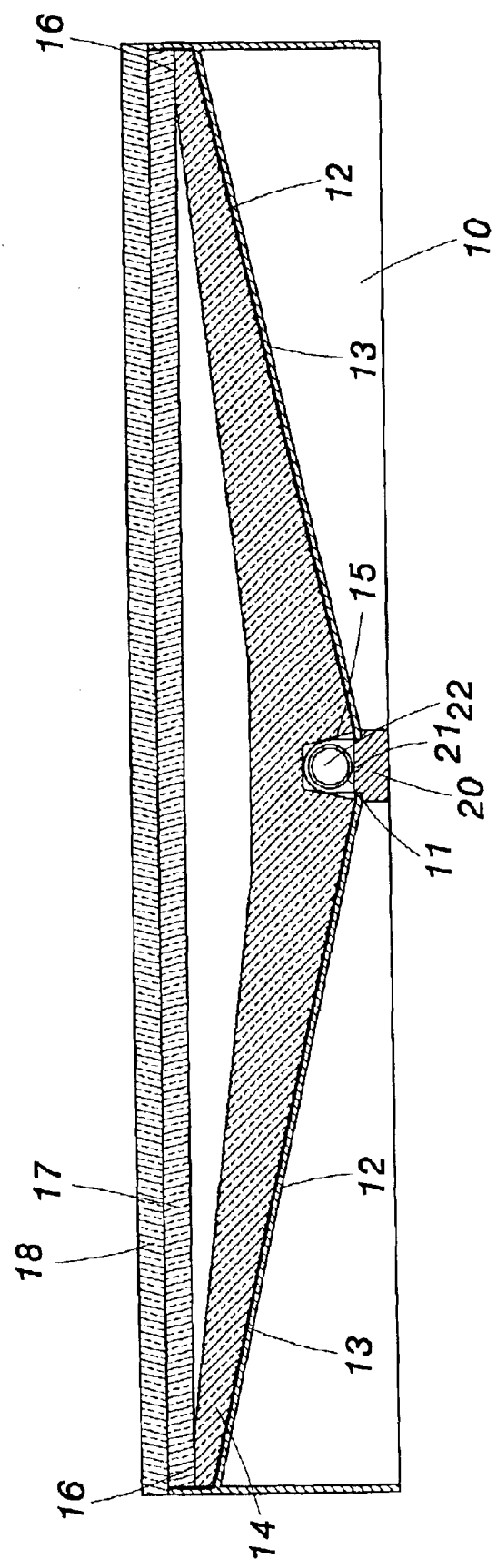
FIG. 3 is a cross-sectional view of the first embodiment of the present invention.
Figure 4:
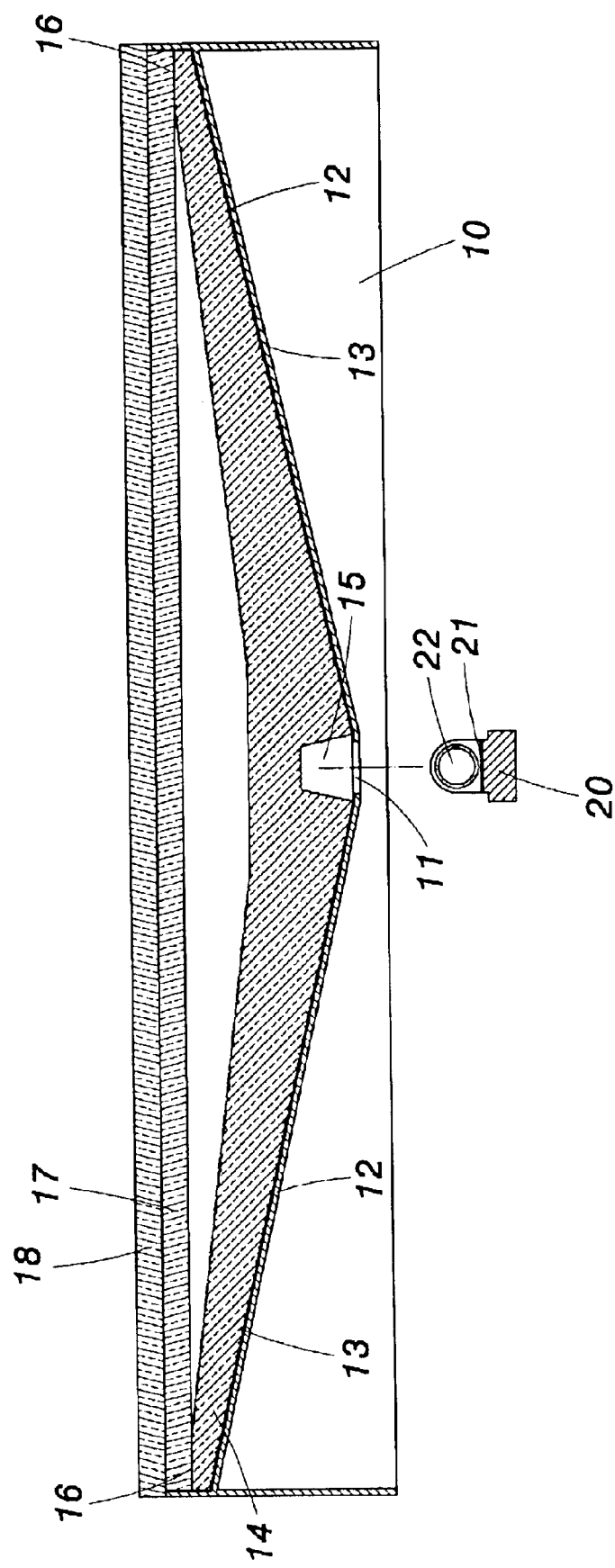
FIG. 4 is an exploded cross-sectional partial view of the first embodiment of the present invention.

Reference is made to FIGS. 2, 3 and 4. The movable base 20 is disposed at the backside of the groove 11, and the upper and lower ends of the movable base 20 are fixedly retained at the upper and lower sides of the base 10. The improved straight down-type backlight module assembly structure is thus formed.

In this embodiment, the groove 11 is disposed in the base 10. The groove 11 is used to receive the light-emitting component 22 in the receiving space 15 so that the light-emitting component 22 is disposed on the base 10 in a detachable way. Therefore, if the light-emitting component 22 is to be maintained or replaced, it is only necessary to open the movable base 20 outside the groove 11 to take the light-emitting component 22 out of the receiving space 15, hence facilitating the maintenance and replacement work.

Figure 5:
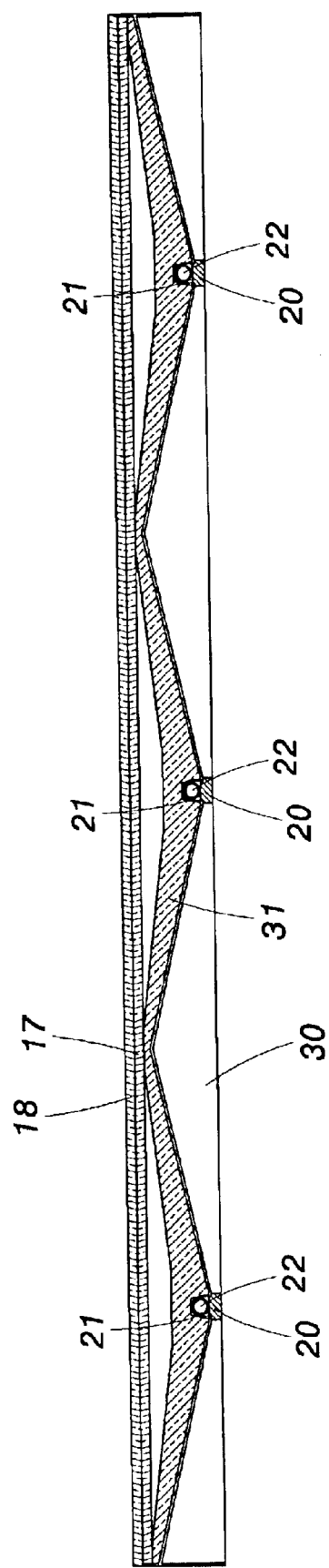
FIG. 5 is a cross-sectional view of a second embodiment of the present invention.

FIG. 5 shows a second embodiment of the present invention, which differs from the first embodiment mainly in that one face of the base 30 and the light guiding component 3 form continuous V shapes. The primary object of this design is to simultaneously install many sets of the movable base 20 and the light-emitting component 22 for enhancing the brightness thereof.

Figure 6:
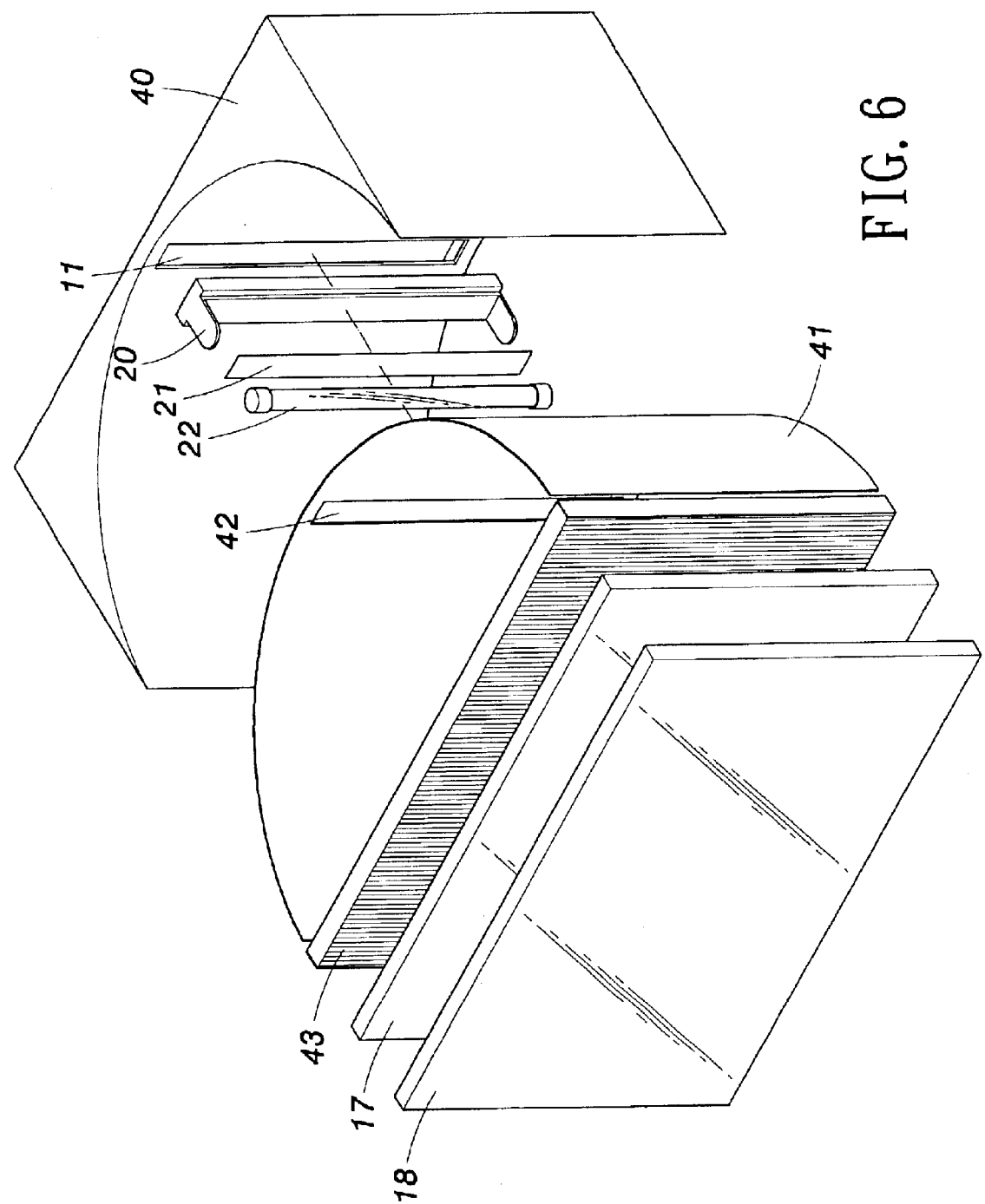
FIG. 6 is an exploded perspective view of a third embodiment of the present invention.
Figure 7:
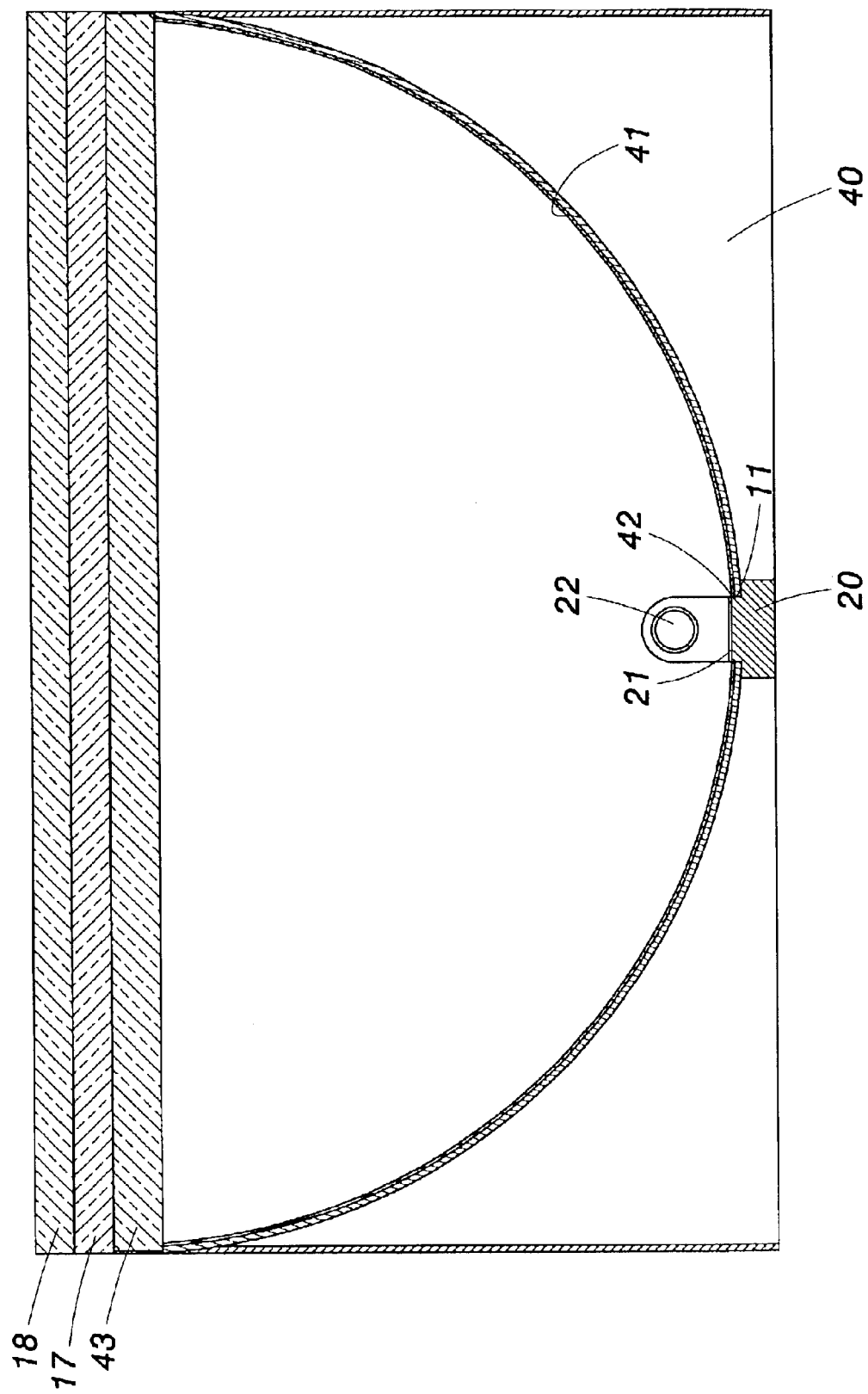
FIG. 7 is a cross-sectional view of the third embodiment of the present invention.

FIGS. 6 and 7 show a third embodiment of the present invention, which differs from the first embodiment mainly in that the base 40 is arc-shaped, the first reflecting component 41 is also an arc-shaped sheet, and a rectangular receiving groove 42 is disposed at the center of the first reflecting component 41. Besides, the light guiding component 43 is a rectangular plate. A groove 11 is also disposed at the center of the base 40 for installation and fastening of the movable base 20 having the light-emitting component 22 disposed therein. Therefore, when maintaining or replacing the light-emitting component 22, it is only necessary to take the movable base 20 out from the groove 11 and then detach the light-emitting component 22.

Figure 8:
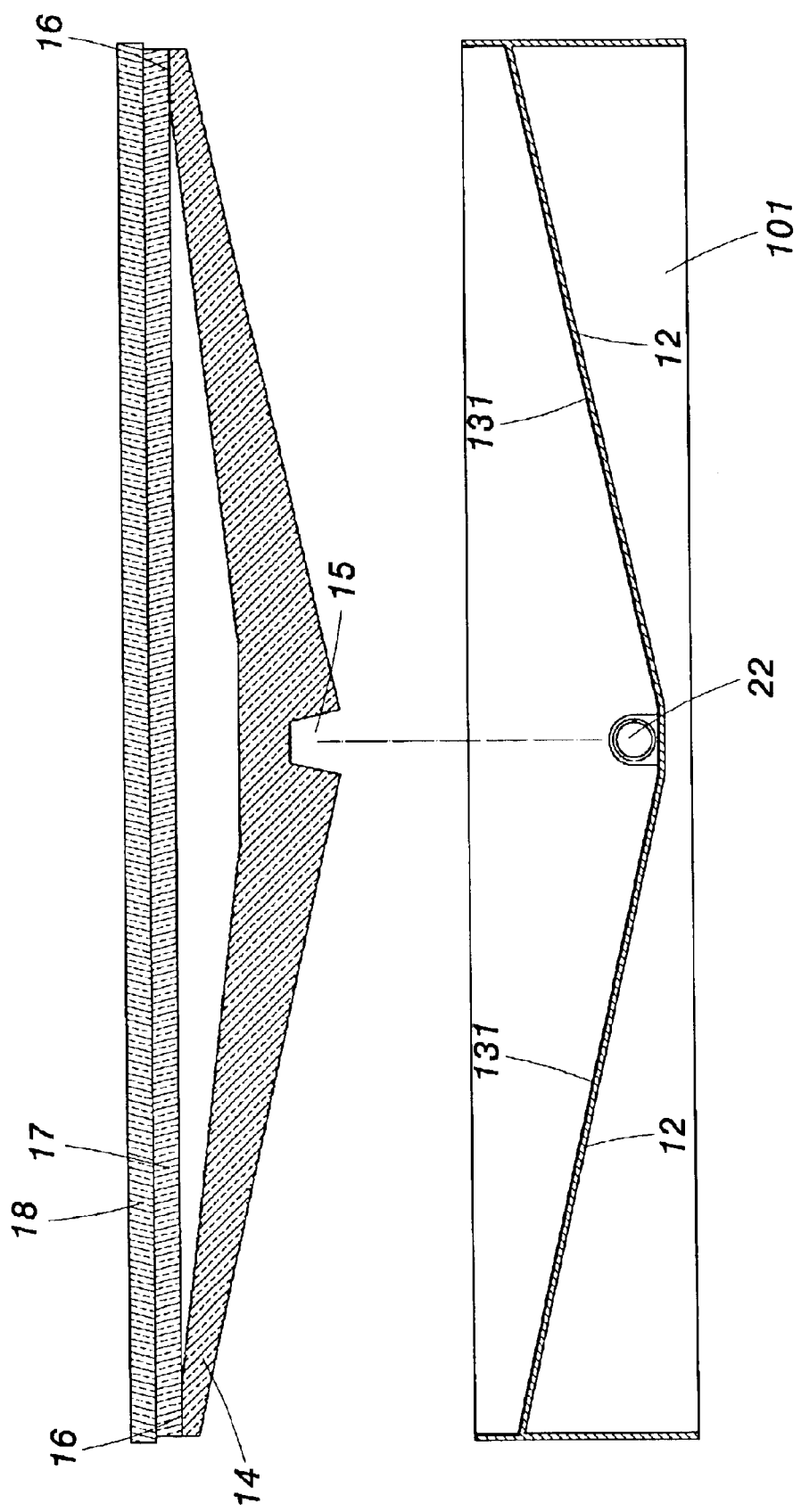
FIG. 8 is an exploded cross-sectional partial view of a fourth embodiment of the present invention.

FIG. 8 shows a fourth embodiment of the present invention, which differs from the first embodiment mainly in that the base 101 is integrally formed without a groove 11, the first reflecting component 131 is also integrally formed and sticks onto the base 101, and the light-emitting component 22 is firmly installed on the first reflecting component 131. In this design, the movable base 20 is not required, hence simplifying the components and also facilitating detachment and maintenance.

To sum up, in the present invention, a groove for receiving a light-emitting component is disposed in a base. The light-emitting component is disposed in a position easy for detachment and near the outside of the base. Therefore, if the light-emitting component is to be maintained or replaced, it is only necessary to take the movable base out from the groove and then detach the light-emitting component. This design can facilitate detachment of the light-emitting component without detaching many unnecessary components. Therefore, the problems of time-consuming and difficult maintenance and replacement of the light-emitting component, unwanted impact and abrasion during detachment, contamination of internal components by dusts, and damaging heat radiation to reduce the lifetime of use of the light-emitting component as occur in a conventional, straight down-type backlight module can be solved. Besides, because the light-emitting component is disposed in the movable base and the base both made of material having good heat-radiating characteristic and near the outside, a better heat-radiating effect can be accomplished, hence increasing the lifetime of use of the light-emitting component.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An improved straight down-type backlight module assembly structure, comprising:

a base with a rectangular groove disposed at a center thereof, two sides of said groove having inclines tilting upwards from the center of said base, a first reflecting component and a light guiding component being disposed in order on said inclines;

a light-emitting component disposed in said groove; and a rectangular movable base with a second reflecting component disposed thereon, said movable base being disposed at a backside of said groove to receive said light-emitting component in said base, upper and lower ends of said movable base being fixedly retained at upper and lower sides of said base;

whereby said light-emitting component is disposed on said base in detachable way.

2. The improved straight down-type backlight module assembly structure as claimed in claim 1, wherein said base and said movable base are both made of a metal having good heat-radiating characteristic.

3. The improved straight down-type backlight module assembly structure as claimed in claim 1, wherein said light-emitting component is a cold cathode fluorescent lamp or a light-emitting diode.

4. The improved straight down-type backlight module assembly structure as claimed in claim 1, wherein said first reflecting component and said second reflecting component are disposed on said inclines or said movable base by means of flat adhesion or electroplating.

5. The improved straight down-type backlight module assembly structure as claimed in claim 1, wherein said base and said movable base are both integrally formed, said first reflecting component is disposed on said base, and said light-emitting component is directly disposed on said first reflecting component.

6. The improved straight down-type backlight module assembly structure as claimed in claim 1, wherein said inclines of said base are arc-shaped, said light guiding component disposed on said first reflecting component is a rectangular plate, and said light-emitting component penetrates said groove to be disposed in said base.

7. The improved straight down-type backlight module assembly structure as claimed in claim 1, wherein said inclines of said base are V-shaped, said light guiding component disposed on said first reflecting component is also V-shaped, and a rectangular receiving space is disposed at an inside of said light guiding component and corresponding to the center of said groove to receive said light-emitting component therein.

8. The improved straight down-type backlight module assembly structure as claimed in claim 1, wherein said base forms continuous V shapes and said light guiding component also forms continuous V shapes for simultaneous installation of many sets of said light-emitting component and said movable base.

* * * * *